United States Patent
Stokes et al.

(10) Patent No.: US 6,874,919 B2
(45) Date of Patent: Apr. 5, 2005

(54) EMERGENCY LIGHTING

(75) Inventors: Peter David Stokes, Norfolk (GB);
Peter Winstanley Bodle, Norfolk (GB)

(73) Assignee: SAF-T-Glo Limited, Norfolk (GB)

( * ) Notice: Subject to any disclaimer, the term of this patent is extended or adjusted under 35 U.S.C. 154(b) by 21 days.

(21) Appl. No.: 09/911,184

(22) Filed: Jul. 23, 2001

(65) Prior Publication Data

US 2002/0015309 A1 Feb. 7, 2002

(30) Foreign Application Priority Data

Jul. 25, 2000 (GB) .............................................. 0018063
Aug. 25, 2000 (GB) .............................................. 0020956
Jan. 8, 2001 (WO) .............................. PCT/GB01/00047

(51) Int. Cl.[7] .............................................. B64D 11/00
(52) U.S. Cl. ...................... 362/471; 362/146; 362/153; 362/374; 362/368; 362/84
(58) Field of Search .......................... 362/84, 146, 812, 362/153.1, 153, 145, 374, 368; 250/462.1–463.1, 464.1, 465.1, 466.1, 467.1

(56) References Cited

U.S. PATENT DOCUMENTS

| | | | |
|---|---|---|---|
| 4,347,499 A | 8/1982 | Burkman, Sr. | |
| 5,331,918 A | 7/1994 | Honigsbaum | |
| 5,775,016 A * | 7/1998 | Chien | ......................... 40/544 |
| 5,961,072 A | 10/1999 | Bodle | |
| 6,276,634 B1 * | 8/2001 | Bodle | ...................... 244/118.5 |

FOREIGN PATENT DOCUMENTS

WO    WO 94/17766    2/1994

OTHER PUBLICATIONS

Copy of International Search Report.

* cited by examiner

Primary Examiner—Stephen Husar
Assistant Examiner—Anabel Ton
(74) Attorney, Agent, or Firm—Reed Smith LLP; Doyle B. Johnson (57) ABSTRACT

An emergency lighting system for an aircraft has photoluminescent material arranged to define an escape path to the exits. The photoluminescent material is encapsulated within a track of predetermined length for securing to the floor of the aircraft. The track comprises a one piece housing formed with a longitudinally extending slot and the photoluminescent material is provided by an insert that is a push-fit in the slot from one end of the housing. The housing is closed at both ends to seal the slot and prevent ingress of dirt or fluid. In a modification the housing is compressed with the insert in place to reduce the height of the track and optionally to provide the track with anti-slip characteristics.

14 Claims, 10 Drawing Sheets

EMERGENCY LIGHTING

BACKGROUND OF THE INVENTION

This invention concerns improvements in or relating to emergency lighting, especially emergency lighting used to indicate an escape path leading to an exit for evacuation of a passenger vehicle in an emergency, for example following an accident.

The invention has particular application to passenger vehicles of the type in which rows of seats are provided on either side of an aisle with an exit at one or both ends of the aisle and/or on one or both sides of the aisle between the ends. Examples of this type of passenger vehicle include aircraft, trains and coaches.

Vehicles of this type are designed to carry a large number of passengers in a confined space. For example, each row may seat two or three passengers on each side of the aisle which is normally only wide enough for one passenger to move along between the aisle seats.

As a result, there may be several passengers in each row who have to access the aisle one at a time and move along the aisle to an exit. Furthermore, as passengers move along the aisle, they obstruct and restrict access to the aisle of other passengers in the rows. It will be understood therefore that passengers must keep moving along the aisle towards the exit(s) to evacuate the vehicle in an efficient, orderly manner. Accordingly, there is a need to ensure that passengers can find their way to the exit(s) easily and reliably.

In most vehicles of this type, an electrical lighting system is fitted at ceiling level which provides sufficient lighting for passengers to evacuate the vehicle under normal circumstances. However, in an emergency following an accident, the electrical lighting system may be inoperable if the electrical connections to the power source are damaged. For example, the electrical connections may be broken by impact damage to the structure of the vehicle or by outbreak of a fire following a crash. Moreover, even if the lighting system remains operable, the outbreak of fire may render the lighting system ineffective if the light is blocked by smoke filling the interior of the vehicle.

The lighting system may also fail in other circumstances without an accident due to faults arising in normal service making it difficult for passengers to leave the vehicle safely at night or in conditions of low ambient light.

For these reasons, it is desirable, and in the case of aircraft mandatory, to provide an emergency lighting system as a back-up to the normal lighting system. Typically, such emergency lighting is provided at floor level and identifies the path leading to the exit(s) for passengers to follow. In this way, if the interior of the vehicle fills with smoke, the emergency lighting is below the smoke level allowing passengers to crawl to the exit(s) along the path illuminated by the emergency lighting.

Traditionally, such emergency lighting has been electrical with the wiring and power source separate from that of the lighting system provided at ceiling level for normal use. The provision of a separate emergency lighting system adds considerably to the costs for initial installation and subsequent maintenance in service with regular checks to ensure operability. In the case of aircraft, the system must be checked each time before take-off and the aircraft is grounded if any repairs are required. The resulting delay is inconvenient for passengers and adds to the running cost for the aircraft operator, especially if a take-off slot has to be vacated.

A further problem of such electrical emergency lighting systems is the extra weight of the storage batteries normally employed as the separate power source which adds to operating costs. Thus, fuel costs may be increased and/or, in the case of aircraft, the number of passengers may have to be reduced to compensate for the extra weight.

The most important disadvantage of the known electrical emergency lighting systems however, is probably that they suffer from the same problem of the electrical connections being broken in a crash resulting from structural damage to the vehicle and/or from fire. Accordingly, such emergency lighting systems can be rendered inoperative just at the very time they are required to assist passengers to evacuate the vehicle.

It is desirable therefore to provide an emergency lighting system which does not depend on electrical connections to a power source to provide the required level of illumination. One such system for use in an aircraft is described in our UK Patent No. 2 314 536 in which the path to the exit(s) is illuminated by photoluminescent material incorporated into a track extending along the aisle for passengers to follow to the exit(s). The photoluminescent material is chosen to provide an acceptable level of illumination over a period of time sufficient for the passengers to evacuate the aircraft.

The emergency lighting system described in our aforementioned patent has met with considerable success due to the many benefits and advantages for both the manufacturer and operator of aircraft in which the system is fitted. Thus, the system does not require connection to a power source thereby eliminating completely the wiring and separate storage batteries required for conventional electrical emergency lighting systems.

In one arrangement, the track comprises an outer housing and an insert provided with the photoluminescent material received within the outer housing. The outer housing includes a base and a separate cover which are releasably connected together to locate and retain the insert. The base and cover are made of plastics such as polycarbonate with at least the cover being transparent or translucent to allow the light emitted by the photoluminescent material to pass through.

By forming the track in this way, when a cover is worn or damaged in service, a replacement cover can be fitted to the existing base and insert allowing the track to be repaired with minimum delay and disruption. In this way, cost savings can be made for maintenance of the track. There can be occasions, however, when it is more convenient to replace the entire track, for example during refurbishment of an aircraft, and in these circumstances the insert may be recovered and re-used. This may allow further cost savings to be made.

SUMMARY OF THE INVENTION

The present invention seeks to provide further improvements to our existing photoluminescent track for use in emergency lighting systems for passenger vehicles and in particular for aircraft.

More particularly, the present invention concerns a photoluminescent track that is of simple construction that facilitates manufacture and assembly.

According to a first aspect of the invention, there is provided a method of manufacturing a photoluminescent track for an emergency lighting system comprising providing an elongate hollow outer member and an elongate inner member having photoluminescent material on at least one side, and push-fitting the inner member in the outer member from one end.

By this invention, the base and cover of our existing track are replaced by a single component integrally formed, for example by moulding or extrusion, whereby assembly of the track is facilitated by allowing the inner member to be slid lengthwise of the outer member from one end.

The outer member is made of a light transmitting material and the inner member is made of a material that is sufficiently rigid to be push fitted in the outer member. For example, the outer member may be made of transparent or translucent plastics such as polycarbonate and the inner member may be made of metal, for example aluminium strip, coated on at least one side with photoluminescent material.

Advantageously, the outer member is formed with an internal longitudinal slot open at one or both ends for inserting the inner member and the method further includes sealing the inner member within the slot. For example, by attaching a closure such as an end cap or foil strip across the open end(s) of the slot. In this way, ingress of dirt or moisture that may affect the life and/or performance of the photoluminescent material is prevented.

The inner member may be removable from the outer member. For example, we may secure the closure with a sealant/adhesive material such as silicone that allows the closure to be detached when it is desired to remove the inner member. In this way, the inner member may be separated from the outer member and re-used, for example if the outer member is damaged or worn and has to be replaced. Additionally, where the upper surface of the outer member is damaged or worn, the inner member may be removed and re-inserted the other way up enabling the track to be re-fitted with the lower surface now uppermost. In this way, the life of the track can be extended by reversing the orientation of the outer member to present a new, clean surface uppermost.

Alternatively, we may provide photoluminescent material on both sides of the inner member. In this way, the track can be laid with either side of the outer member uppermost without removing and re-fitting the inner member the other way up. This arrangement also enables the life of the track to be extended if the side that is uppermost initially becomes worn or is damaged.

According to a preferred feature of the invention, the outer member is compressed in a direction transverse to its length after the inner member has been inserted to reduce the depth of the track and axially locate the inner member within the outer member.

Such compression may be effected by any suitable means, for example the assembled track may be passed between a pair of pressure rollers engaging the top and bottom surfaces of the outer member or placed in a press. The compression may be applied across the full width of the track or it may be restricted to selected regions only, for example along both edges.

We may pre-heat the track prior to compressing the outer member. Such pre-heating may soften the outer member sufficiently to facilitate the compression of the outer member. Alternatively, we may cold form the outer member by applying the compression without pre-heating.

The compression may be employed to apply a pattern to the surface of the track. For example, we may employ rollers having grooves in the peripheral surface that form ribs in the surface of the outer member on one or both sides. The pattern may be decorative and/or provide the track with an anti-slip surface to reduce the risk of accidents.

According to a second aspect of the invention, we provide a photoluminescent track for an emergency lighting system comprising an elongate hollow outer member having first and second major wall portions connected by opposed side wall portions to define a longitudinally extending slot, and an elongate inner member extending lengthwise of the slot and having photoluminescent material on one side covered by one of the major wall portions of the outer member, wherein the inner member is a push-fit from one end of the slot for assembly of the track, and said one major wall portion of the outer member is made of a material to transmit light emitted by the photoluminescent material.

By this invention, the inner member provided with the photoluminescent material is enclosed and surrounded along the length of the track by the outer member which is formed in one piece. In this way, there are fewer parts for assembly of the track and there is less risk of dirt or liquid being trapped by the outer member. As a result savings in the cost and time for assembly, cleaning and maintenance of the track can be achieved.

The slot is preferably closed by a closure such as an end cap or a thin strip of a material such as metal foil attached to the outer member with a sealant/adhesive material such as silicone or any other suitable means. In this way, the slot is sealed to retain the inner member within the outer member and the closure can be removed if it is desired to remove the inner member. Furthermore, the provision of the closure does not significantly alter the length of the outer member allowing discrete lengths of track to be butted together.

In a preferred arrangement, the outer member is formed with the slot open at both ends. For example, the outer member may be an extrusion and cut to any desired length. The inner member can then be inserted from either end of the outer member and both ends of the slot closed by attaching a closure to seal the inner member in the outer member.

In an alternative arrangement, the outer member is formed with the slot open at one end and closed at the other end. For example, the outer member may be a moulding of predetermined length. The inner member can then be inserted from one end only which is closed by attaching a closure to seal the inner member in the outer member. With this arrangement only one closure is required.

The inner member is preferably the same or substantially the same length as the outer member. In this way, discrete lengths of the track can be butted end to end with no perceptible break in the light emitted between adjoining lengths of the track. More preferably, the inner member is the same or substantially the same length and substantially the same width as the outer member. In this way, light is emitted over substantially the whole surface area of one of the major wall portions of the track.

Advantageously, the outer member is made of transparent or translucent plastics material such as polycarbonate although it will be understood that other plastics materials may be used. Preferably, the plastics material forms a substantially rigid outer member which can withstand loads applied to the track, for example people walking on the track, and which is resistant to cleaning fluids or other liquids which may come into contact with the track. The plastics material may also be fire resistant to reduce or prevent the generation of smoke or hazardous fumes.

The inner member preferably comprises a base of sheet metal such as aluminium provided on one side with a layer of photoluminescent material and an optional fluid protective cover layer on top of the photoluminescent layer. A light coloured base layer may be provided under the photoluminescent layer. By the use of a metal base, the inner member is sufficiently rigid for push fitting in the slot from one end of the outer member even where the outer member is of long length. Furthermore, the inner member can be made relatively thin which in turn allows the depth of the outer member to be kept to a minimum. As a result, the track may be produced with a low profile which enables the same track to be used in carpeted and non-carpeted areas of a vehicle.

The inner member is slidable lengthwise of the slot for push fitting the inner member during assembly. The inner member may be removed from the slot in a similar manner. In this way, the inner member may be recovered and re-used if the outer member is worn or damaged and has to be replaced.

Preferably the outer member is symmetrical enabling the outer member to be laid either way up. In this way, the track may be repaired by lifting a damaged section, removing and refitting the inner member the other way up and replacing the track so that the underside is now uppermost to provide a new, clean surface over the photoluminescent material of the inner member.

Alternatively, we may provide photoluminescent material on both sides of the inner member. As a result, the track can be fitted either way up without removing and re-fitting the inner member. In this way, a repair can be effected more easily.

The major wall portions of the outer member may have substantially planar outer surfaces. Alternatively, the outer surface of at least that major wall portion overlaying the photoluminescent material may be provided with formations having anti-slip characteristics. The formations may be restricted to the side edge regions so as not to interfere with the transmission of light emitted by the photoluminescent material. For example, the formations may comprise a series of axially spaced transverse ribs of v-shape.

The assembled track may be subjected to a post forming operation to compress the outer member in a direction transverse to the length and thereby reduce further the depth of the track. The post forming may be carried out by passing the track between a pair of pressure rollers which may also apply formations for the anti-slip properties to the outer surface of the track. The post forming may be effected with or without preheating to soften the outer member for conforming to the reduced thickness.

The track may be retrofitted to a vehicle after manufacture either to provide an emergency lighting system or to replace an existing emergency lighting system. Alternatively or additionally, the track may be fitted as original equipment during manufacture of a vehicle.

Where the track is fitted as original equipment, it may be pre-assembled to components for assembly of the vehicle. For example, for installation of the track on the floor of the vehicle, it is envisaged that the track may be attached to the floor panels for assembly of the vehicle. The track may be manufactured in pre-determined lengths corresponding to the size of the floor panels. In this way, the track is built-in during assembly of the vehicle and a separate assembly operation to install the emergency lighting system is avoided.

Thus, according to a third aspect of the invention, we provide a component for use in the construction of a vehicle wherein the component is provided with a photoluminescent track to define an escape route in the assembled vehicle.

Preferably, the component is a floor panel employed in the construction of an aircraft and the photoluminescent track is arranged to extend on one side of an aisle leading to an exit. More preferably, the floor panel is provided with a pair of laterally spaced photoluminescent tracks that are arranged to extend on opposite sides of the aisle to identify the boundaries of the aisle and define an escape path between the tracks leading to the exit. In a preferred arrangement, the component is provided with the photoluminescent track according to the second aspect of the invention.

According to a fourth aspect of the invention, we provide a vehicle, preferably an aircraft, having rows of seats on either side of an aisle, and a photoluminescent track according to the second aspect of the invention extending along each side of the aisle to identify the boundaries of the aisle and define therebetween an escape path leading to an exit at one or both ends of the aisle and/or between the ends of the aisle.

Preferably, the photoluminescent track is mounted on the floor and is substantially continuous along each side of the aisle leading to an exit. In this way, the escape route is not obscured by people moving along the aisle between the tracks. As a result, there is less risk of people leaving the aisle and becoming trapped between the rows of seats.

Advantageously, the track includes markings to indicate the route to an exit. For example, the track may be provided with arrows or similar direction indicators to show where an exit aisle leads from the main central aisle to an exit. Alternatively or additionally, the word "exit" or the like may be provided in the track. Some form of direction indicator is generally preferred however as avoiding problems with language and/or reading words.

The markings may be formed with photoluminescent material on the inner member so as to emit light of a different colour to the rest of the track. In this way, the light output from the track is not reduced by the provision of the markings. This feature of the markings assists the smooth, continuous movement of passengers towards the exit thereby facilitating the evacuation of the vehicle in an emergency.

Typically, on each side of the aisle, the seats in each row are provided by a demountable multi-seat unit allowing the number and arrangement of seats to be altered. For example, seat units comprising two, three or four seats may be provided. These units are normally of different width with the result that the width of the aisle between seat units on each side can change when one seat unit is replaced by another seat unit with more or less seats. This can lead to problems where an emergency lighting system is provided by a floor mounted track. In particular, if a wider seat unit is fitted which extends over the track, the escape path may be concealed.

The position of the floor mounted track is fixed on installation of the emergency lighting system and, to accommodate changes in the seating layout, it is preferred to provide the seat units with a photoluminescent track on the side of the aisle seat, preferably close to the floor. The track on the aisle seats is provided in addition to the existing floor track and will provide an escape route for passengers to follow where the floor track is concealed by the seat unit. In this way, the appearance of a substantially continuous track along each side of the aisle leading to an exit may be maintained without modification to the floor track.

Thus according to a fifth aspect of the invention, we provide in or for an aircraft having rows of seats on each side of an aisle and a photoluminescent track extending along each side of the aisle at or near floor level, at least one row including a demountable multi-seat unit on at least one side of the aisle such that the width of the aisle may be altered by fitting any selected one of a plurality of demountable multi-seat units of different width, wherein a photoluminescent track is provided on that side of the multi-seat unit which, in use, is arranged adjacent to the aisle.

Preferably, the track comprises a strip of photoluminescent material overlaid by a cover of transparent or translucent material attached to the seat unit to locate and retain the photoluminescent strip in place. The photoluminescent strip may be the same or similar to the inner member of the track according to the second aspect of the invention.

Embodiments of the invention will now be described in more detail by way of example with reference to the accompanying drawings.

DETAILED DESCRIPTION OF THE EXEMPLARY EMBODIMENTS

Referring first to FIGS. 1 to 5 of the drawings, a photoluminescent track 1 is shown comprising an elongate hollow housing 2 of uniform, generally rectangular cross-section and an elongate insert 3. The housing 2 has flat upper and lower walls 2a and 2b respectively connected by opposed side walls 2c, 2d to define therebetween a substantially rectangular slot 4.

The insert 3 has a width 'w' and thickness 't' slightly less than the corresponding dimensions of the slot 4 to provide limited clearance for push-fitting the insert 3 in the slot 4 from one end of the housing 2. The insert 3 extends the length of the slot 4 between the ends of the housing 2 and the width of the slot 4 between the sides of the housing 2.

The dimensions of the housing 2 and insert 3 are chosen so that the insert 3 emits light over a major part, preferably at least 75% and more preferably at least 90%, of the surface of the upper wall 2a of the housing 2 overlying the photoluminescent material.

Figure 4:
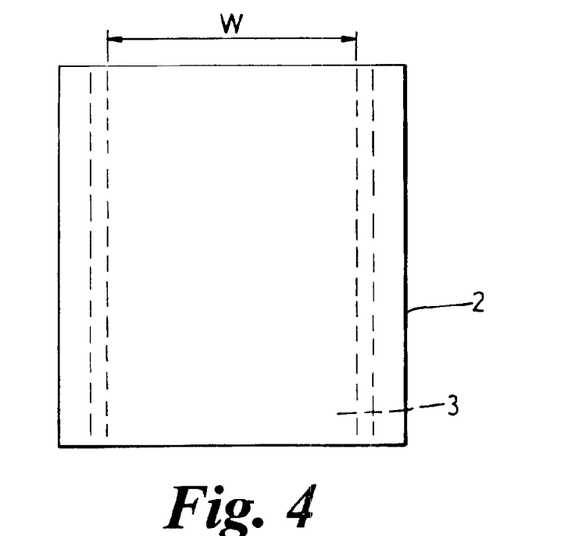
FIG. 4 is a plan view of the track shown in FIG. 1.
Figure 5:
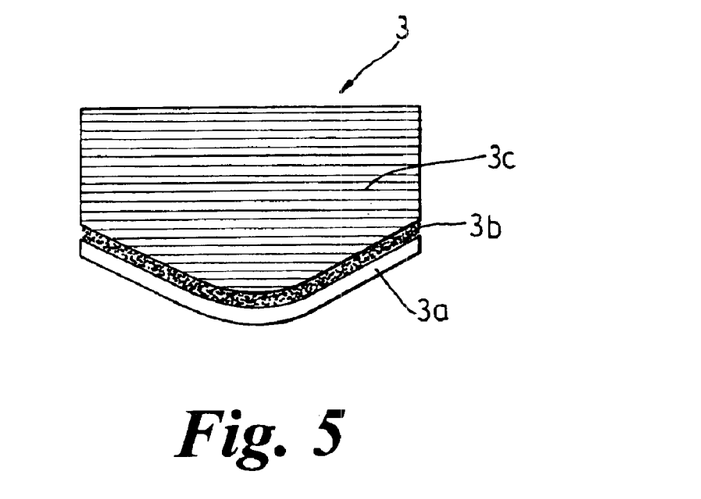
FIG. 5 is an enlarged cross section of the insert of the track shown in FIG. 1.
Figure 6A:
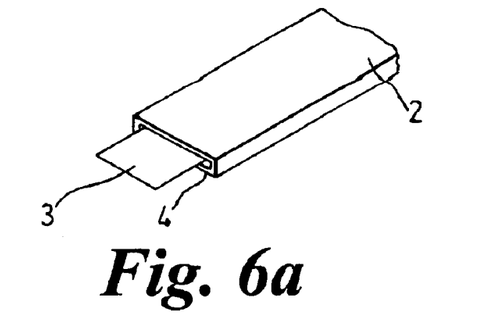
FIGS. 6a through 6e are perspective views of one end of the track shown in FIGS. 1 to 5 showing an alternative method of sealing the track using end caps.
Figure 6B:
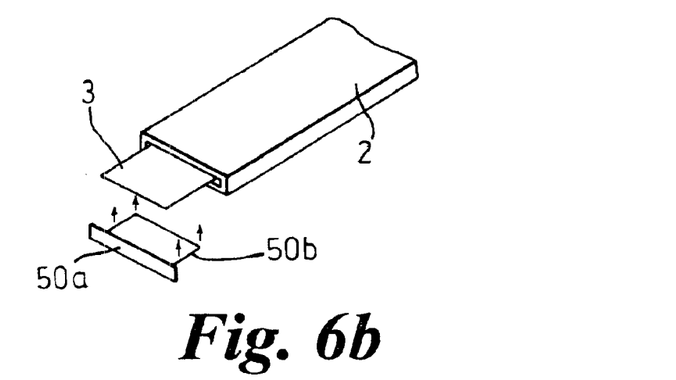
Figures 6C, 6D, 6E:
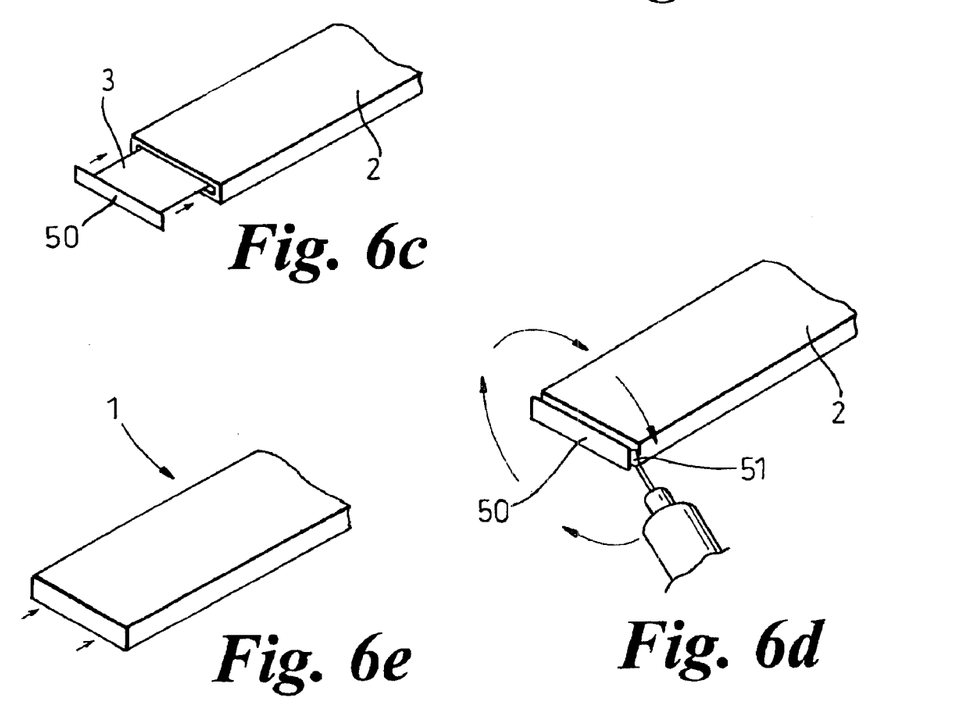

As best shown in FIG. 4, the insert 3 comprises a base 3a of sheet aluminium covered on one side by a layer 3b of photoluminescent material overlaid with a fluid protective layer 3c of clear plastics or lacquer. The use of aluminium for the base 3a has advantages over the vinyl base employed for the insert described in our earlier patent.

In particular, we have found that adhesion of the layer 3b of photoluminescent material is improved and that chemical interaction between the insert 3 and the housing 2 is eliminated or significantly reduced. We have also found that using aluminium for the base 3a in place of vinyl improves the fire resistance and/or smoke generation characteristics of the insert 3.

In this embodiment, the photoluminescent material emits a green or yellow-green light that is visible when the level of ambient light from natural or artificial light sources is low. It will be understood that photoluminescent material which emits other colours of light may be employed. Further details of suitable photoluminescent materials are provided in our afore-mentioned earlier patent the disclosure of which is incorporated herein by reference.

The housing 2 is a one piece moulding of a rigid plastics such as polycarbonate which transmits the light emitted by the photoluminescent material. The plastics may also be fire resistant. In this embodiment, the housing 2 is formed in lengths of 1 meter which may be cut into shorter lengths as desired for any required application.

It will be understood, however, that the housing 2 can be formed in longer or shorter lengths and in fact a range of standard lengths may be provided for selection and fitment in the appropriate combination for any given installation. Alternatively, the housing 2 may be formed by extrusion and cut to the required length for assembly with the insert 3.

The insert 3 is cut to the length of the housing 2 and is a push-fit in the slot 4 from one end of the housing 2 with the layer 3b of photoluminescent material uppermost. The insert 3 is sufficiently rigid by virtue of forming the base 3a from sheet aluminium to allow push fitting for any length of housing 2. In addition, the strength/rigidity required for push-fitting the insert 3 can be achieved with relatively thin sheet material allowing the track 1 to be produced with a low profile. This is a further advantage of using aluminium for the base 3a in place of vinyl.

The insert 3 is enclosed and surrounded by the housing 2 along the length of the track and the slot 4 is closed at each end by attaching a thin strip of metal foil (not shown) or similar sheet material to the end faces of the housing 1. For example, the metal foil may be bonded by an adhesive sealant such as silicone or any other suitable means.

In this way, the slot 4 is sealed to prevent ingress of dirt or fluids and the insert 3 is encapsulated within the housing 2 when the track 1 is in use. Moreover, when the track 1 is replaced, the insert 3 can be removed by detaching or rupturing the foil and sliding the insert 3 out of the housing 2 allowing the insert 3 to be re-used.

Furthermore, if the upper surface 2a of the housing 2 is damaged or becomes worn (scratched or scuffed), a repair can be effected by lifting the appropriate section of the track 1, removing the insert 3 and re-fitting it the other way up within the housing 2. The section of track 1 can then be re-fitted with the damaged or worn upper surface 2a facing down and the lower surface 2b facing up.

In this way, the track 1 can be provided with a new clean, upper surface by reversing the orientation of the damaged section of track 1. As a result, the life of the track 1 can be extended and a repair carried out using the existing track 1. This is of particular benefit if a repair is required and there is no stock of spare parts available to replace the damaged section of track 1.

Referring now to FIGS. 6a through 6e there is shown an alternative method of sealing the track 1 in which the slot 4 is closed at each end (one end only shown) by a respective end cap 50 secured to the housing 2.

Each end cap 50 is similar and comprises a face plate 50a sized to match the cross-section of the housing 2 and an integral tongue 50b sized to fit within the slot 4 below the insert 3. As a result, the end caps 50 do not increase significantly the length of the housing 2 or block the absorption/emission of light by the insert 3.

The end caps 50 are secured by applying a continuous bead 51 of sealant adhesive such as silicone to bond the face plate 50a to the end of the housing 2. In this way, the slot 4 is sealed to prevent ingress of dirt or fluids and the insert 3 is encapsulated within the housing 2.

The sealant adhesive employed enables the end caps 50 to be prised off if it is required to remove the insert 3 for re-use or re-furbishment as described previously.

Figure 7:
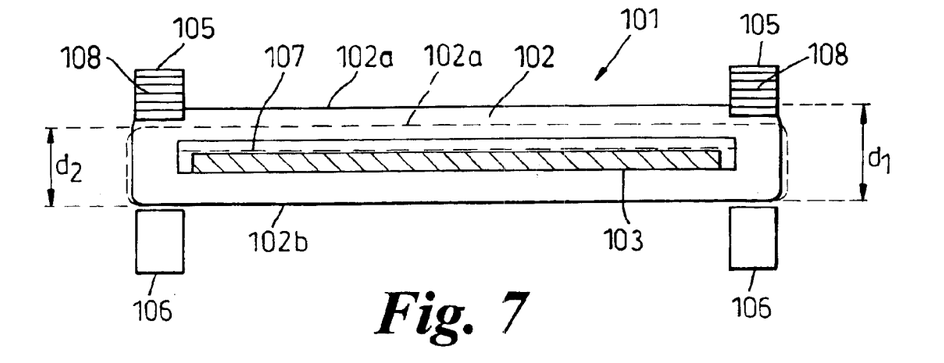
FIG. 7 is an end view similar to FIG. 3 showing a modification to the track of FIGS. 1 to 5.
Figure 8:
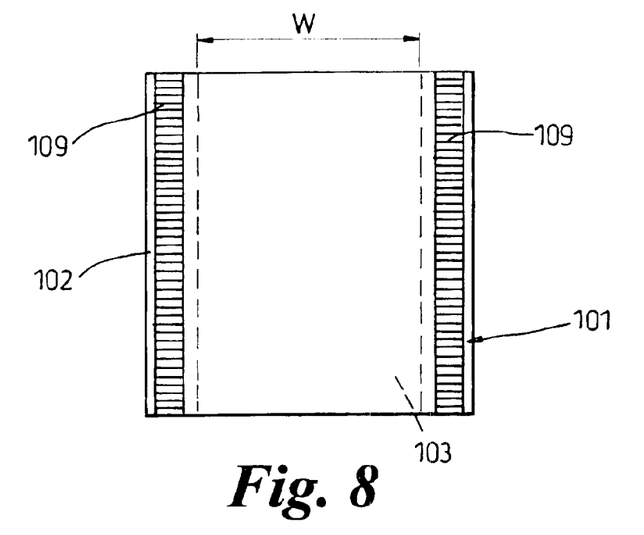
FIG. 8 is a plan view of the track shown in FIG. 7.

Referring now to FIGS. 7 and 8, a further modification to the above-described track 1 is shown in which like reference numerals in the series 100 are used to indicate corresponding parts.

The track 101 again comprises a housing 102 and an insert 103 received in a longitudinal slot 104 within the housing 102 by push fitting from one end as described for the previous embodiment.

The housing 102 is then compressed in a direction transverse to the length following insertion of the insert 103 by passing each side of the assembled track 101 between a pair of rollers 105, 106. Strips of metal foil or end caps (not shown) are attached to the ends of the housing 102 as described previously to seal the insert 103 within the housing 102.

The compression force is controlled to partially flatten the sidewalls 102c, 102d of the housing 102 and take-up the clearance space 107 between the insert 103 and the upper and lower walls 102a, 102b of the housing 102. As a result, the insert 103 is located between the upper and lower walls 102a, 102b and is fully encapsulated by the housing 102.

In FIG. 7, the solid lines show the assembled track 101 prior to compression between the rollers 105, 106 and the broken lines show the assembled track 101 after compression between the rollers 105, 106. As shown, the depth '$d_2$' of the housing 102 is reduced compared to the depth '$d_1$' of the housing 102 as initially formed. In this way, the finished track 101 has a low profile suitable for use with floor coverings of different thickness butted up against the side edges.

This reduction in depth may be accompanied by a slight increase in the width of the housing 102 compared to the width as initially formed due to the local thickening of sidewalls 102c, 102d. Alternatively, we may prevent any increase in the width of the housing 102 by providing stops (not shown) on each side of the housing 102 where it is compressed between the rollers 105, 106.

The assembled track 101 may be cold formed by passage between the rollers 105, 106. Alternatively, the assembled track 101 may be preheated prior to passage between the rollers 105, 106. The level of preheating may be chosen to soften the plastics material of the housing 102 sufficiently to assist compression of the sidewalls 102c, 102d and then cooling the track 101 to set the plastics material in the new, flatter configuration. For example, where the housing 102 is made of polycarbonate, we may pre-heat the track to approximately 130° C. prior to passing between the rollers 105, 106 followed by air or water cooling.

In accordance with a preferred feature of this embodiment, the upper rollers 105 are formed with transverse ribs 108 of V-shape that form corresponding V-shaped grooves 109 in the surface of the upper wall 102a of the housing 102. These grooves 109 are restricted to the side edge regions of the upper wall 102a and, when the track 101 is installed, face outwardly. As a result, the side edge regions have anti-slip characteristics that reduce the risk of passengers slipping when stepping on the track 101.

The compression may be applied across the full width of the track 101. For example, by replacing the rollers 105, 106 with wider rollers or providing additional pairs of rollers between the rollers at the edges of the track. Alternatively, the track 101 may be inserted in a press or similar device for compressing the track transverse to its length.

Figure 9:
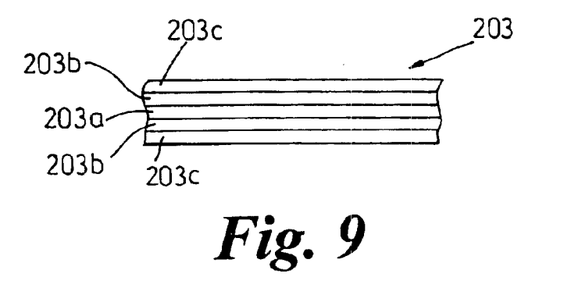
FIG. 9 is an enlarged cross-section of a modified insert.

Referring now to FIG. 9, there is shown a modification to the insert 3,103 used in the tracks 1,101 above-described in which like reference numerals in the series 200 are used to indicate corresponding parts.

In this embodiment, the insert 203 is provided with a layer 203b of photoluminescent material overlaid with a fluid protective layer 203c of clear plastics or lacquer on each side of the aluminium base strip 203a. As a result, when the insert 203 is assembled in the housing 2,102, the track 1,101 can be fitted either way up to present a layer 203b of photoluminescent material uppermost.

This arrangement also enables a repair to be carried out by lifting a damaged section of track 1,101 and re-fitting the track 1,101 the other way up so that the underside becomes the topside and the damaged topside becomes the underside. This can be done without removing the insert 203 from the housing 2,102 and avoids having to re-seal the end of the track 1,101.

It will be understood this arrangement enables a repair to a damaged or worn section of the track 1,101 to be carried out quickly and easily by reusing the original section of the track 1,101. Thus, it is only necessary to carry out the following steps:

(a) lift the damaged section of track 1,101, (b) clean the underside to remove any adhesive originally used to secure the section of track 1,101 in place, (c) apply new adhesive to the worn or damaged topside, and (d) re-fit the section of track 1,101 with the topside now facing downwards and the underside facing upwards to present a new, clean undamaged surface outwards.

This can be done in a short period of time, for example during the normal turn around between flights thereby avoiding delays while repairs are effected. Furthermore, as the track section is re-fitted, no spare parts are required thereby reducing the risk of the aircraft being grounded through lack of suitable spare parts to effect a repair.

Where the insert 203 is used with the housing 102 of FIGS. 7 and 8, both rollers 105, 106 (or other means employed to compress the housing 102) may be formed with transverse ribs 108 of V-shape. As a result, corresponding V-shaped grooves 109 are formed in the surface of the upper wall 102a and the lower wall 102b of the housing 102.

In this way, the side edge regions of the track 101 have anti-slip characteristics on both the upper and lower surfaces. Thus, when a section of track 101 is reversed to effect a repair, the side edge regions of the new surface match the side edge regions of the surface of the existing adjacent sections of track 101.

Where both the upper and lower surfaces of the track 101 are formed with grooves 109, it is preferred to apply adhesive to the centre region of the track 101 between the side edge regions at least when the track 101 is originally fitted. As a result, the grooves 109 on the underside are not filled with adhesive which may be difficult to remove when lifting a damaged section of track 101 that is to be reversed and re-fitted.

In this way, cleaning the underside of a section of track 101 which is lifted for reversing and re-fitting is facilitated. Moreover any dirt that may have penetrated under the track 101 and partially or completely filled the grooves 109 will normally be easily removed when cleaning the underside to remove adhesive from the centre region between the grooves 109.

Figure 10:
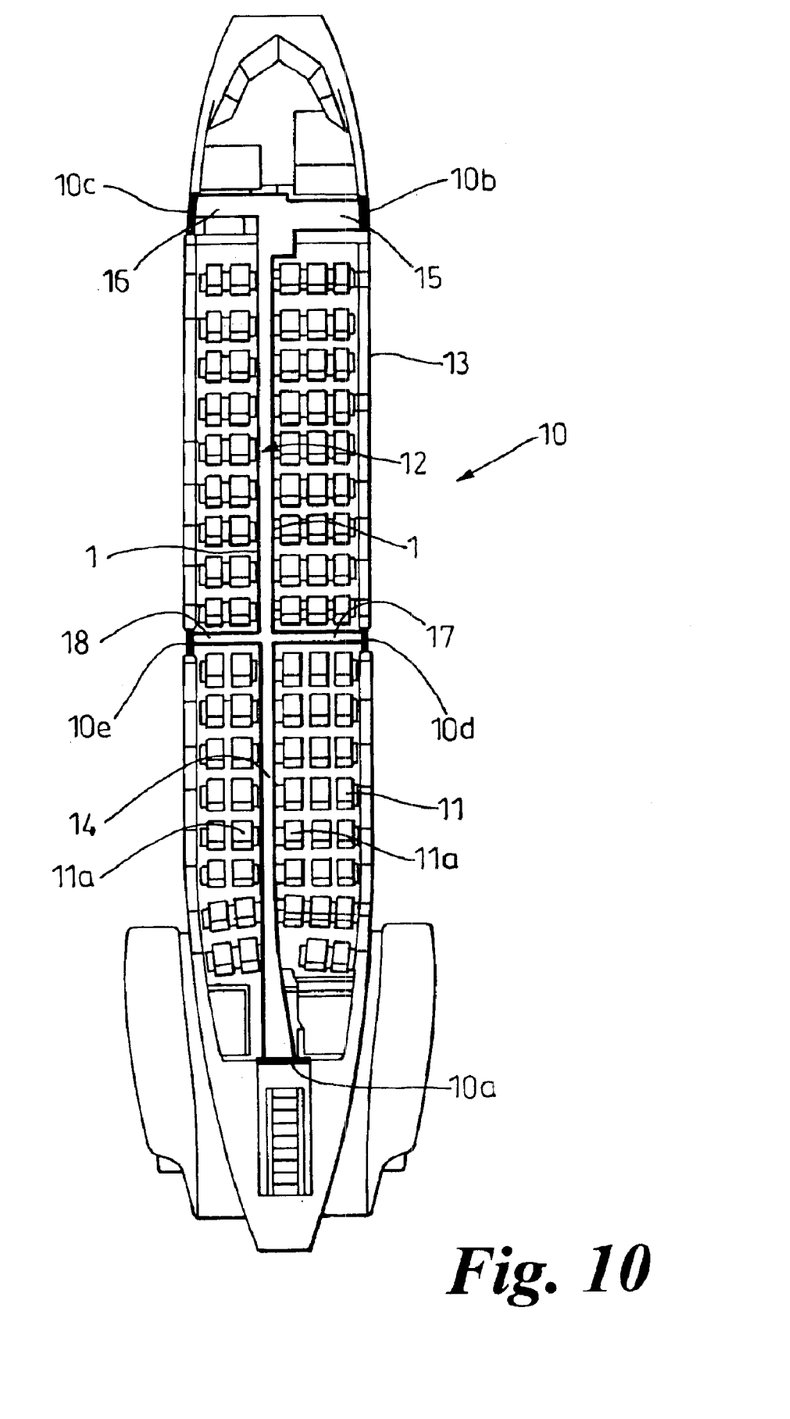
FIG. 10 shows a general arrangement of an emergency lighting system incorporating the track of FIGS. 1 to 5 in an aircraft.
Figure 11:
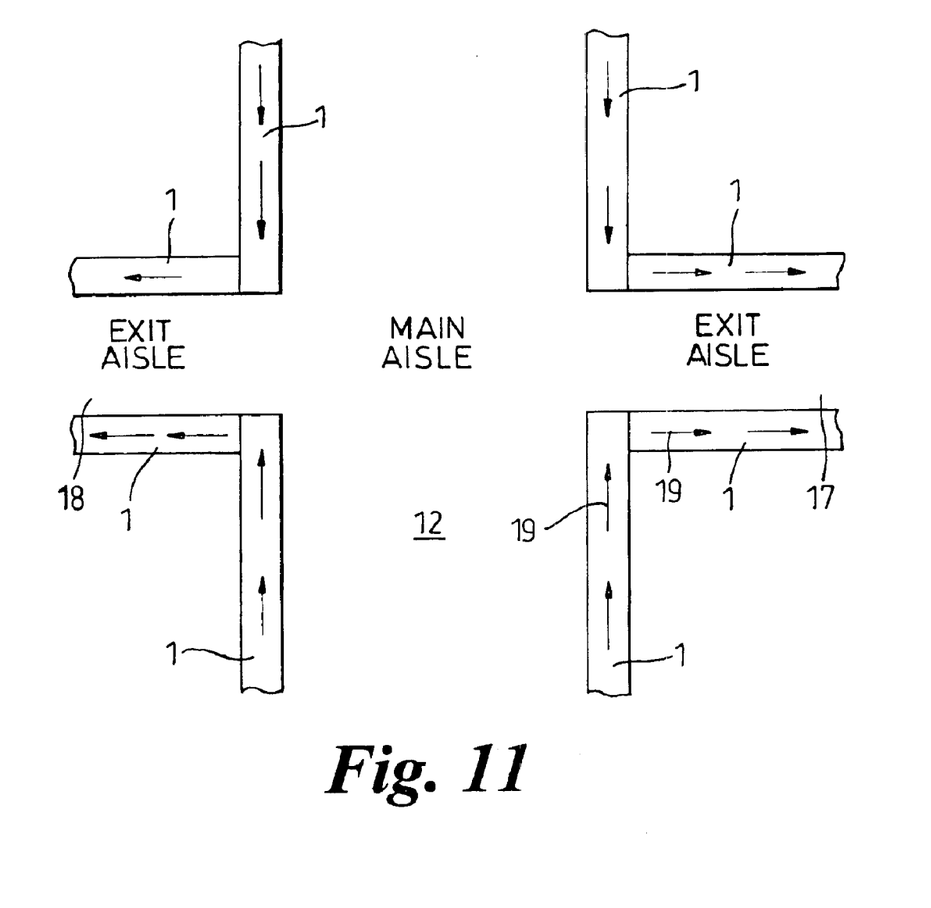
FIG. 11 shows a detail of the emergency lighting system shown in FIG. 10 in the region of an emergency exit.
Figure 12A:
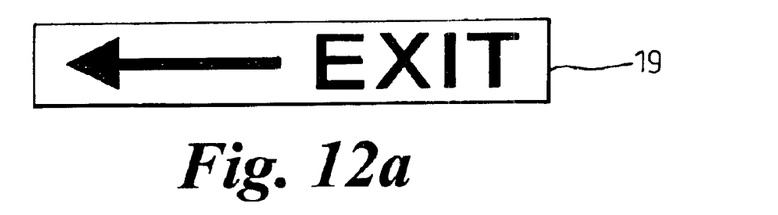
FIGS. 12a through 12f show examples of various markings that can be incorporated in the track of the present invention.
Figure 12B:
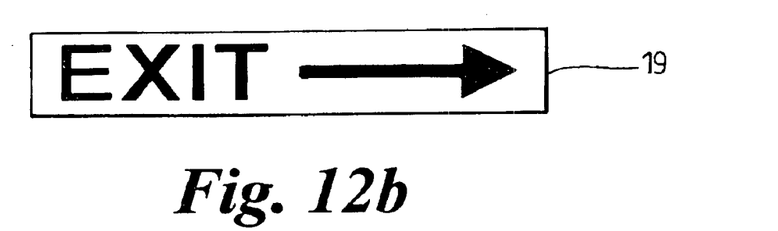
Figure 12C:
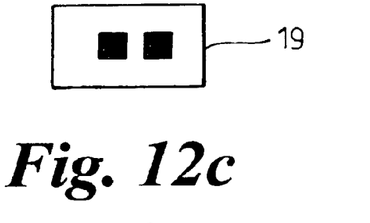
Figure 12D:
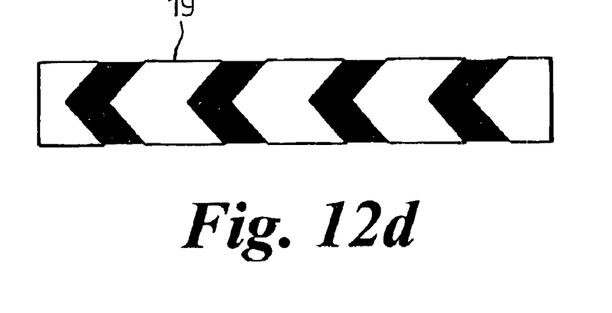
Figure 12E:
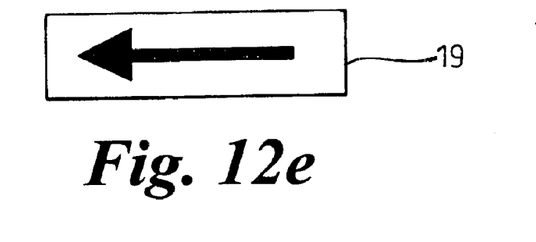
Figure 12F:
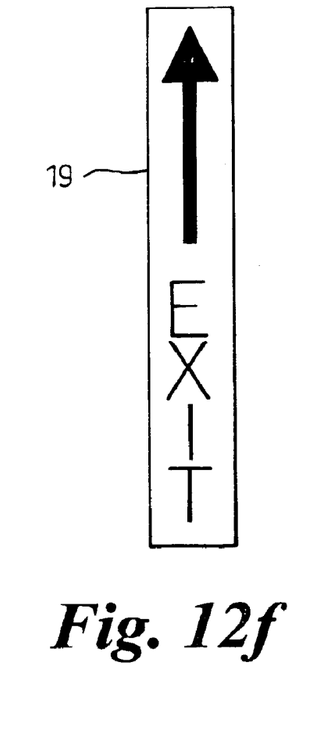
Figure 13A:
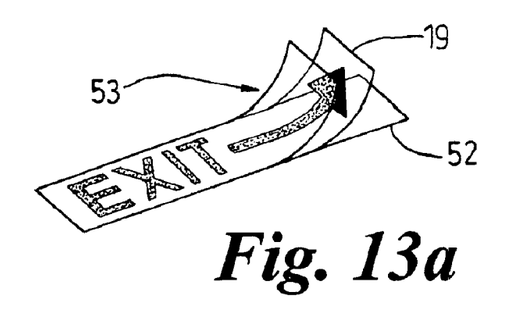
FIGS. 13a through 13d are perspective views showing the method of attaching the markings.
Figure 13B:
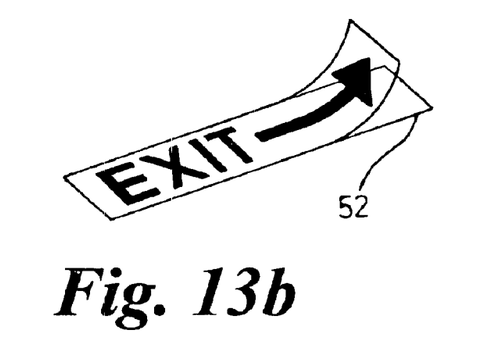
Figure 13C:
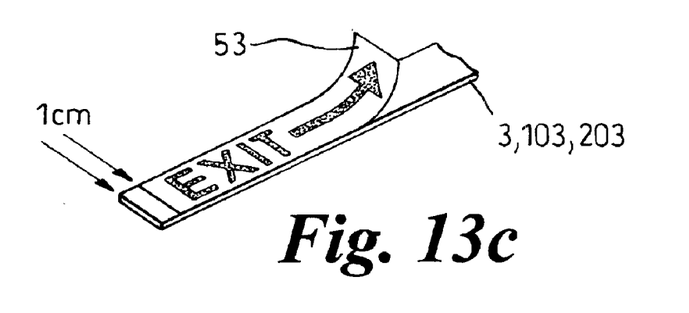
Figure 13D:
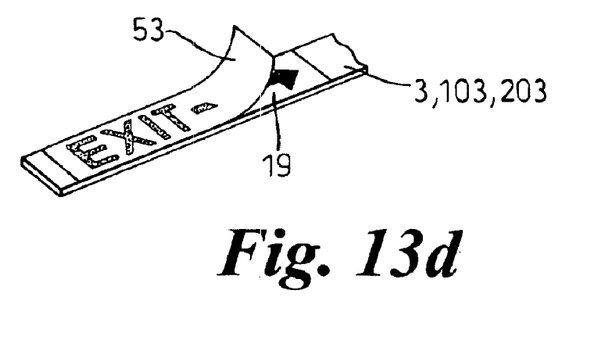

With reference now also to FIGS. 10 and 11, there is shown the general layout of an emergency lighting system incorporating the track 1 in an aircraft 10.

The aircraft 10 has a plurality of rows of seats 11 disposed on either side of a main aisle 12 extending the length of the passenger compartment or cabin 13.

A rear exit 10a is provided at the back of the cabin 13 and a pair of front exits 10b, 10c are provided on opposite sides of the cabin 13 at the front. The exits 10a, 10b, 10c are employed for passengers to get on and off the aircraft both in normal use and in an emergency.

A further pair of exits 10d, 10e are provided on either side of the cabin 13 approximately mid-way between the ends of the aisle 12, usually opening over the wings (not shown) of the aircraft 10 and which are only used in an emergency.

The emergency lighting is positioned on the floor along each side of the main aisle 12 adjacent to the aisle seats 11a to define an aisle path 14 extending from the rear exit 10a the length of the cabin 13 between the aisle seats 11a.

At the front of the cabin 13, the emergency lighting is positioned along each side of a pair of exit aisles 15, 16 extending from the main aisle 12 to the front exits 10b, 10c respectively.

Between the ends of the main aisle 12, emergency lighting is positioned on each side of another pair of exit aisles 17, 18 extending from the main aisle 12 to the centre exits 10d, 10e respectively.

In this way, the emergency lighting defines an escape route from any row of seats 11 in the cabin 13 along the main aisle 12 and exit aisles 15, 16, 17, 18 to the exits 10a, 10b, 10c, 10d, 10e.

The emergency lighting is provided by arranging pre-formed lengths of encapsulated track 1, for example 1 or 2 meter lengths, end to end or at right angles to each other. A pre-formed length of track 1 can also be cut into a shorter length and the cut end sealed to enable the emergency lighting to be adapted to suit the layout of the seats and exits in a particular aircraft.

Each length of track 1 has the insert 3 extending between the ends so that, when lengths of track 1 are laid end to end or at right angles, the light emitted by the inserts 3 is substantially unbroken along the escape route and provides a continuous cue from any region of the main and exit aisles to an exit.

As best shown in FIG. 11, lengths of track 1 may incorporate markings 19 to show where the exit aisles 17, 18 lead from the main aisle 12 to the centre exits 10d, 10e. The markings 19 may be applied to the insert 3 and encapsulated within the track 1 during manufacture.

The markings 19 may be in the form of symbols such as arrows, chevrons or the like. Alternatively or additionally, the markings 19 may include words such as 'exit' or the like to reinforce the message provided by the symbols.

The markings 19 may be made visible by transmitting light of a different colour to the insert. For example the markings 19 may be applied using a dye that glows with light of a different colour to the rest of the insert 3. In this way, the light output of the insert 3 is not reduced.

Alternatively, the markings 19 may be made visible by blocking the light emitted by the insert 3. For example, the markings 19 may be applied using symbols and/or words that appear dark against an illuminated background.

FIGS. 12a through 12f show various types of self-adhesive markings 19 such as arrows, chevrons, words etc for use in the tracks 1,101 above-described and FIGS. 13a through 13d show a method of attaching the markings.

The markings 19 are attached to the photoluminescent insert 3,103 after removal of a backing film 52 from the lower surface to expose the adhesive. Once applied, a protective application tape 53 is removed from the upper surface to expose the markings 19.

In this way, markings 19 can be provided at appropriate positions to indicate the direction to an exit and to identify the position of an exit. The markings 19 may be made visible by blocking the light emitted the insert 3,103 so as to appear dark against an illuminated background. Alternatively, the symbols 19 may be made visible by transmitting light of a different colour to the background.

Similar markings may be provided to indicate where the exit aisles 15, 16 lead from the main aisle 12 to the exits 10b, 10c at the front of the aircraft 10, and also to indicate where the main aisle 12 leads to the exit 10a at the rear of the aircraft 10.

By the use of such markings, people moving along the main aisle 12 are provided with an advance warning as they approach an exit aisle 15, 16, 17, 18 and, on reaching an exit aisle 15, 16, 17, 18, are directed into the exit aisle 15, 16, 17, 18 towards the exits 10b, 10c, 10d, 10e.

The size and/or spacing of the markings may alter as the junction between the main aisle 12 and the exit aisles 15, 16, 17, 18 is approached to provide a visual warning of the proximity of the exit aisles 15, 16, 17, 18. For example, the arrows 19 may become smaller and more closely spaced together nearer the exit aisles 15, 16, 17, 18.

As a result, people can enter an exit aisle 15, 16, 17, 18 from the main aisle 12 with confidence assisting the smooth flow of people towards the exits 10a, 10b, 10c, 10d, 10e and reducing congestion. This is particularly important in an emergency where people may be confused and start to panic if the track 1 does not provide a positive indication of the route to an exit 10a, 10b, 10c, 10d, 10e. In this way, evacuation of the aircraft is facilitated in a simple and effective manner.

The track 1 can be retrofitted to existing aircraft to replace electrical emergency lighting systems with a photoluminescent system, for example during refurbishment, or it can be fitted as original equipment to provide new aircraft with a photoluminescent emergency lighting system.

Where the track 1 is fitted to new aircraft, it is envisaged that the track 1 could be incorporated into the structure of the aircraft at an early stage of the production. For example, the track 1 could be fitted to the floor panels prior to assembly.

Figure 1:
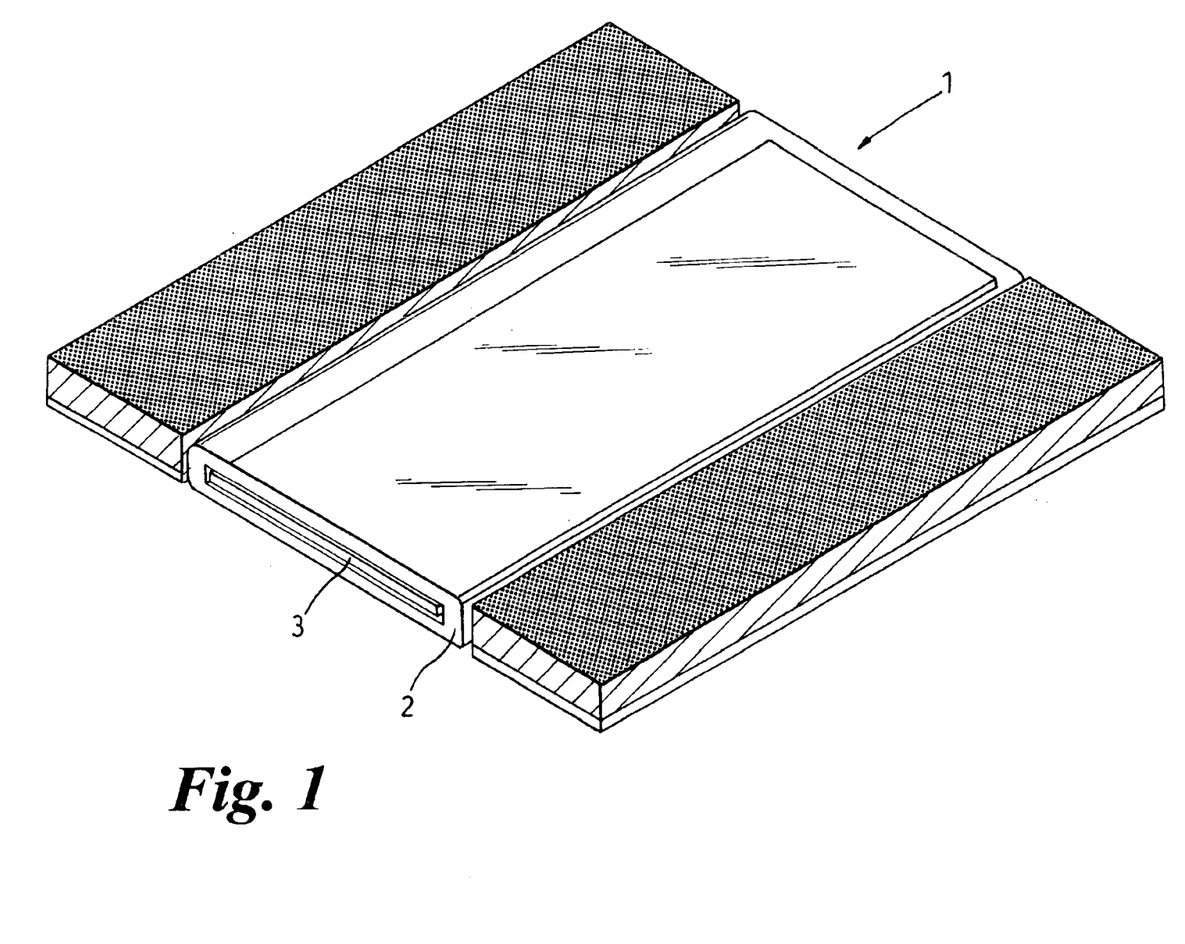
FIG. 1 is a perspective view of a track according to the present invention.
Figure 2:
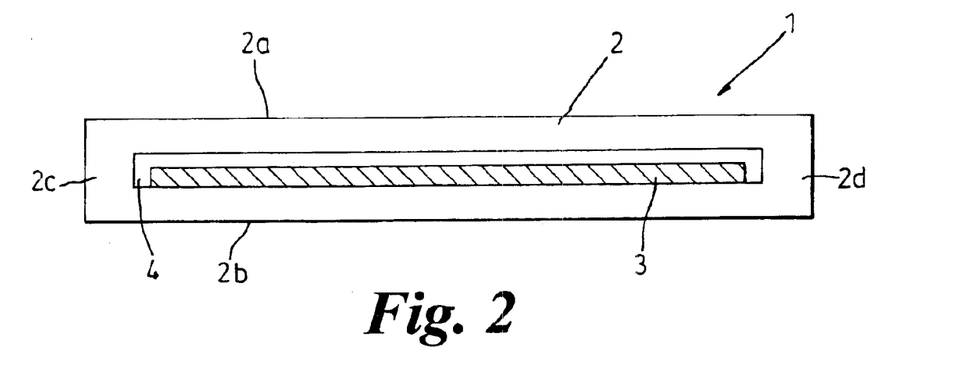
FIG. 2 is an end view of the track shown in FIG. 1.
Figure 3:
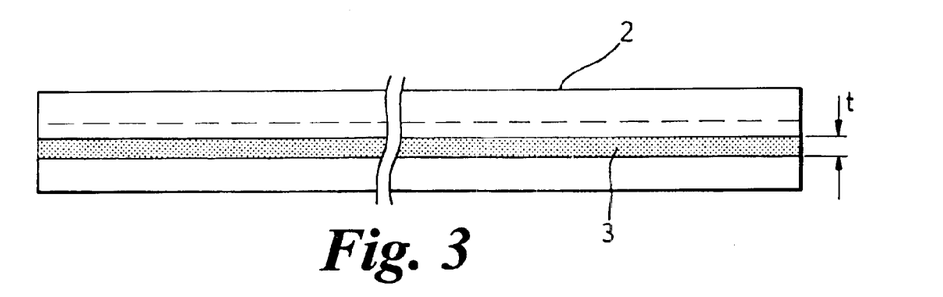
FIG. 3 is a side view of the track shown in FIG. 1.

A particular feature of the track 1 according to the present invention is the low profile or depth of the track 1 such that it may be fitted in both carpeted and non-carpeted areas of the aircraft 10 with advantages for both the manufacture and installation of the track 1. In FIG. 1, the track 1 is shown with the flooring material butted up against the flat sides of the track 1 and the flat upper surface of the track substantially flush with the flooring material.

In this way, installation of the track 1 does not present a safety hazard for passengers to trip over. Also, the upper surface of the track 1 is less susceptible to damage by people walking on the track 1 and/or from wheels of trolleys or cleaning equipment riding over the track 1.

Moreover, cleaning the floor in which the track 1 is laid is facilitated and there are no areas for dirt or liquid to become trapped and cover the track 1. The upper surface of the track 1 may be given a surface hardening treatment to increase the resistance to damage, especially scratching which may impair the emission of light from the track 1.

It will be understood that the track 101 may be used in place of the track 1 with the lower profile produced by compressing the outer member 102 providing further benefits and advantages for installation of the track 101 with a variety of different floor coverings.

Figure 14:
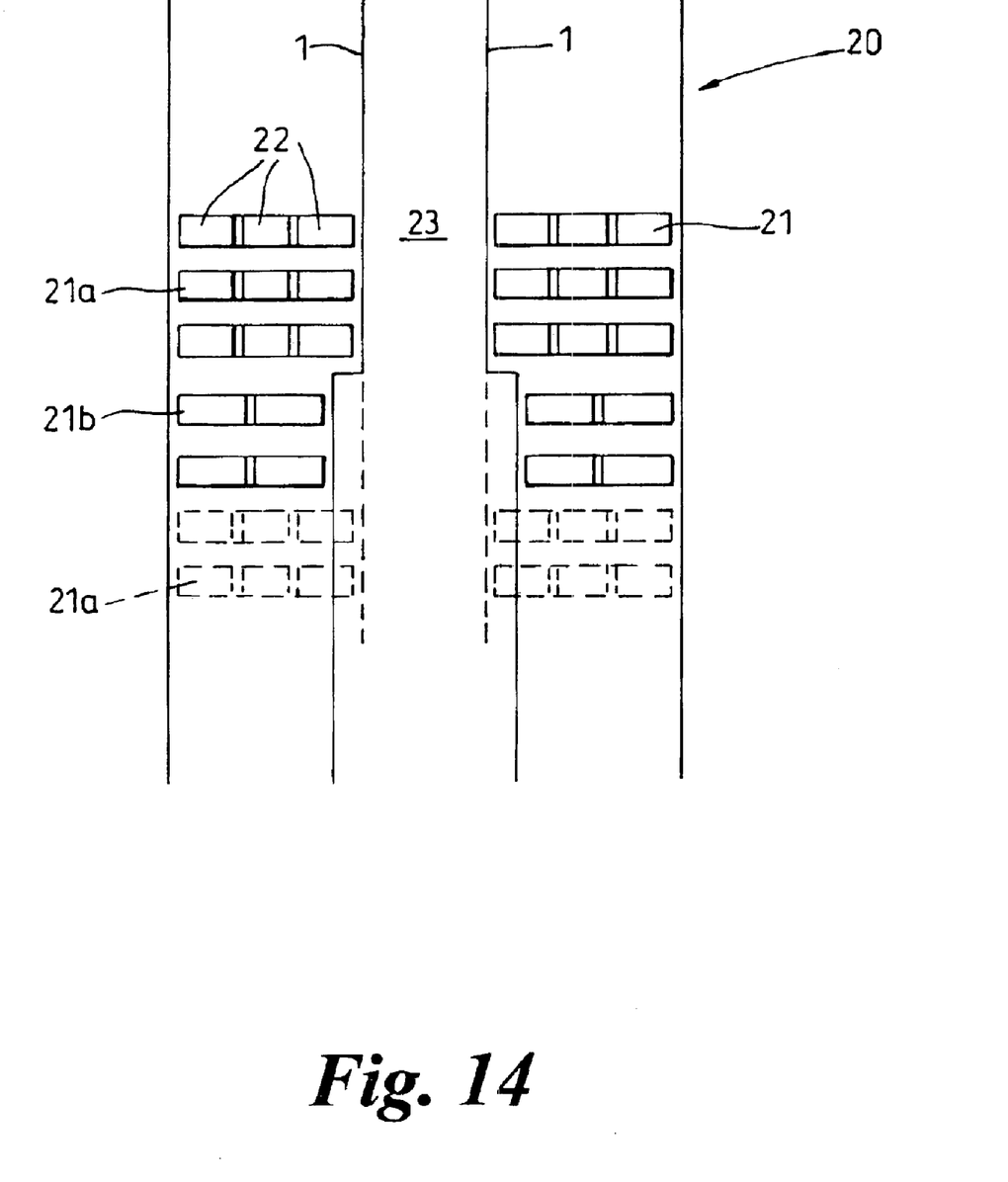
FIG. 14 shows schematically the general arrangement of an emergency lighting system incorporating the track of FIGS. 1 to 5 in an aircraft having interchangeable seat units.
Figure 15:
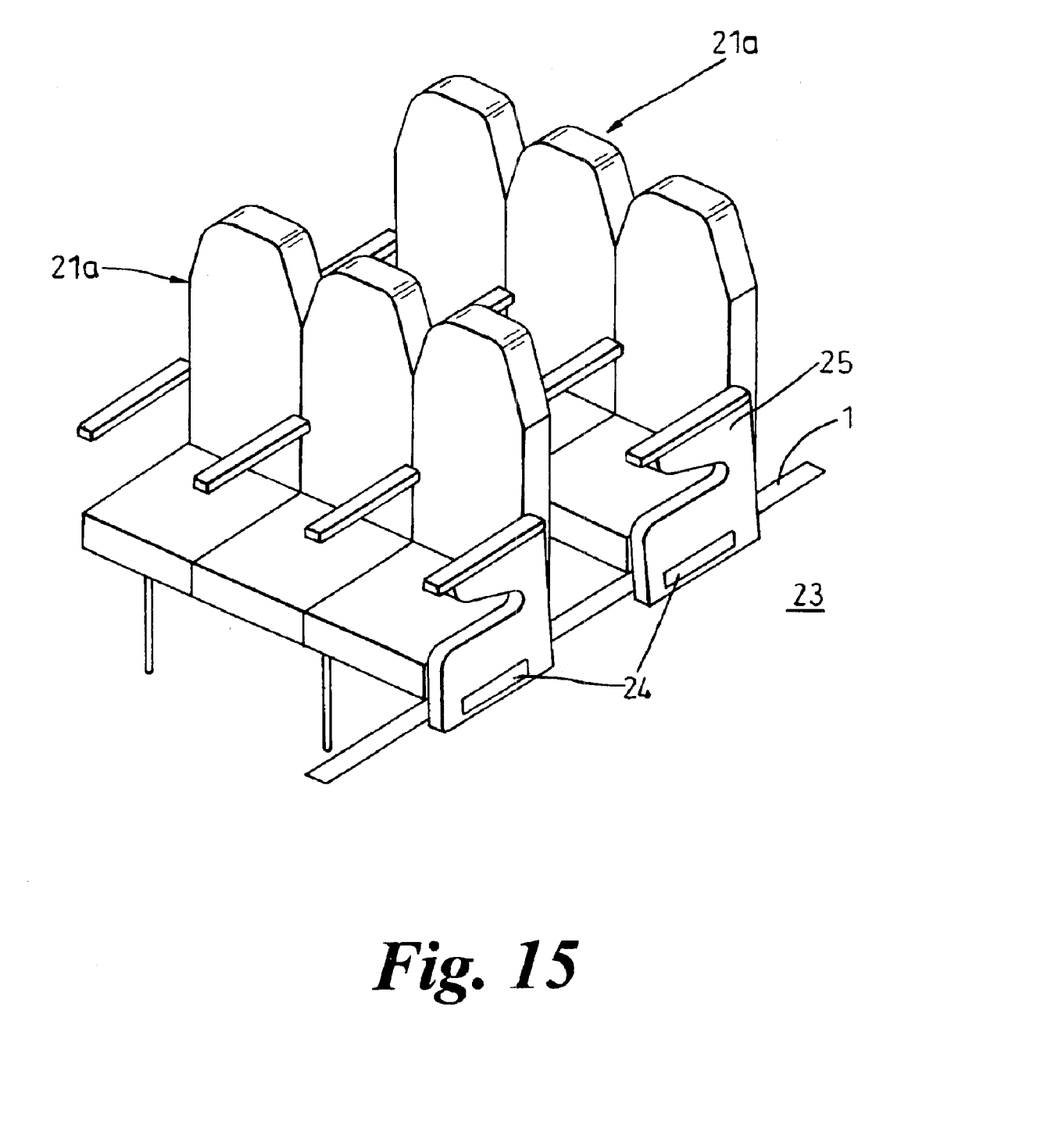
FIG. 15 shows a detail of the aisle seat of an interchangeble seat unit for the emergency lighting system of FIG. 14.

Referring now to FIGS. 14 and 15, there is shown the arrangement of an emergency lighting system employing the track 1 of FIGS. 1 to 5 in an aircraft 20 having interchangeable demountable seat units 21 of different width.

The aircraft 20 has rows of seats 22 in two sections. In a first section, each row has six seats, three on each side of the main aisle 23. In a second section, each row has four seats, two on each side of the main aisle 23. The first section may be for economy class passengers and the second section for business class passengers.

Each group of three seats in the first section is provided by a demountable multi-seat unit 21a and each group of two seats in the second section is provided by a demountable multi-seat unit 21b. The units 21a are wider than the units 21b and aisle 23 is narrower between the units 21a in the first section than between the units 21b in the second section.

The photoluminescent track 1 extending along each side of the aisle 23 is arranged to identify the boundaries of the aisle 23 and the escape path defined therebetween is wider in the second section.

As a result, if the wider seat units 21a are fitted in the second section as shown in dotted outline in FIG. 14 to increase the capacity of the aircraft 20, the width of the aisle 23 is reduced. This has the effect that the new boundary of the aisle 23 is no longer indicated by the existing track 1 which is now obscured by the wider seat units 21a. It will be understood this is but one example of the effect of changing one seating unit for another and that other arrangements and combinations of multi-seat units may give rise to the same problem.

To alleviate this problem without altering the layout of the existing track 1 on the floor of the aircraft 20, a photoluminescent track 24 is provided on the side of the aisle seat of the wider seat units 21a which overlie the floor track 1. In this way, the track 24 identifies the boundary of the aisle 23 and defines an escape path between the seat units which the passengers can follow to evacuate the aircraft 20.

As best shown in FIG. 15, the aisle seat has a side panel 25 and the track 24 is located on the side facing the aisle at the bottom of the panel 25 close to the floor. The track 24 is formed by a strip of the insert 3 which can be mounted in a frame or carrier (not shown) releasably attached to the side panel 25 to overlie and protect the insert 3. The frame or carrier may be a moulding of a suitable transparent or translucent material, for example a plastic material such as polycarbonate.

The track 24 extends in the longitudinal direction of the aisle 23 and may be provided with markings such as arrows or words as described previously. The track 24 can be of different lengths depending on the size and/or shape of the side panel 25 to which it is fitted. In a modification (not shown), the track 24 is incorporated into the side panel 25, for example the side panel 25 may be provided with a slot or recess to receive the insert 3.

Again, it will be understood that the track 1 may be replaced by the track 101 and that the photoluminescent tracks 1, 101 and 24 above-described may be combined with other features to assist evacuation of the aircraft 10, 20 in an emergency. For example, the position of the exits 10a, 10b, 10c, 10d, 10e may be identified by photoluminescent material on the doors and/or more preferably on the door surround so that the position of the exit can be identified with the door both closed and open. The handles and any instructions for opening the doors may also be identified and highlighted by the use of photoluminescent material.

As will be appreciated, the photoluminescent tracks 1, 101 and above-described are 24 mounted at or near floor level and provide an escape route for passengers to follow if the cabin fills with smoke blocking light from any other source. In addition to these floor level tracks, photoluminescent tracks may also be provided at ceiling level to guide passengers to the exits without the presence of smoke in the cabin from a fire or other source. For example, if the main lighting system fails at night or in conditions of low ambient light in the cabin in normal conditions or in an emergency. Thus, electrical emergency lighting systems with separate storage batteries, wiring connections and associated parts may be eliminated entirely by the use of a fully integrated photoluminescent system for emergency lighting and exit identification.

It will be understood that the above-described embodiments are intended to illustrate the diverse range and application of the invention and that features of the embodiments may be used separately or in combination with any other feature of the same or different embodiments to produce a photoluminescent track that can be used as emergency lighting to identify an escape route.

Moreover, while the specific materials and/or constructions of track described and illustrated are believed to represent the best means currently known to the applicant, it will be appreciated that the invention is not limited thereto and that various modifications and improvements can be made within the spirit and scope of the claims.

We claim:

1. A method of manufacturing a photoluminescent track for an emergency lighting system comprising a plurality of photoluminescent track sections arranged end to end wherein each track section is a sealed unit formed by:

providing an elongate hollow outer member of unitary box-section having first and second major wall portions and opposed side wall portions, said first and second major wall portions extending between and integral with said side wall portions to define a longitudinally extending slot having a length, a width, an open first end and a second end;

providing an elongate inner member having photoluminescent material on at least one side and push-fitting said inner member in said outer member from said open first end of said slot wherein said elongate inner member is substantially the same length and same width as said slot and extends from said open first end to said second end of said slot and between said opposed side wall portions with one of said first and second major wall portions overlying said at least one side of said inner member and being made of a material to transmit light; and providing a closure member having a flat panel for said open first end and attaching said closure member to an end face of said outer member around said open first end of said slot to close and seal said slot with said inner member within said slot.

2. A method according to claim 1 wherein said outer member is made of transparent or translucent plastics.

3. A method according to claim 1 wherein said photoluminescent material emits light over at least 90% of said overlying major wall portion.

4. A method according to claim 1 wherein said outer member is compressed in a direction transverse to its length after said inner member has been inserted to reduce the depth of said track section.

5. A method according to claim 4 wherein said compression is applied across the full width of said track section.

6. A method according to claim 4 wherein said compression is restricted to side edge regions of said track section.

7. A method according to claim 4 wherein said track section is pre-heated prior to compressing said outer member.

8. A method according to claim 1 wherein said outer member is cut to length from a hollow extrusion of box-section and said slot is closed and sealed at said first end and said second end by a respective closure member.

9. A method according to claim 1 wherein said closure member has a tongue extending transverse to said panel that is received in said slot between said inner member and the other of said first and second major wall portions of said outer member.

10. A photoluminescent track for an emergency lighting system comprising a plurality of photoluminescent track sections arranged end to end wherein each track section comprises a sealed unit comprising:

an elongate hollow outer member of unitary box-section having first and second major wall portions and opposed side wall portions, said first and second major wall portions extending between and integral with said side wall portions to define a longitudinally extending slot having a length, a width, a first end and a second end;

an elongate inner member having photoluminescent material on at least one side, said inner member being substantially the same length and same width as said slot and extending from said first end to said second end of said slot and between said opposed side wall portions with one of said first and second major wall portions overlying said at least one side of said inner member and being made of a material to transmit light;

wherein at least one of said first end and said second end of said slot is open to allow said inner member to be inserted in said slot and is closed by a flat panel attached to an end face of said outer member around said open end of said slot to close and seal said slot with said inner member within said slot.

11. A photoluminescent track according to claim 10 wherein said closure member has a tongue extending transverse to said panel that is received in said slot between said inner member and the other of said first and second major wall portions of said outer member.

12. A photoluminescent track according to claim 10 wherein said major wall portions of said outer member have substantially planar outer surfaces.

13. A photoluminescent track according to claim 10 wherein said slot is closed by said outer member at said second end.

14. A photoluminescent track according to claim 10 wherein said slot is open at both ends and is closed by attaching a respective closure member to each end face of said outer member to close and seal said slot.

* * * * *